(12) United States Patent
Zheng

(10) Patent No.: US 11,119,511 B2
(45) Date of Patent: Sep. 14, 2021

(54) METHOD AND DEVICE FOR OBSTACLE OR GROUND RECOGNITION AND FLIGHT CONTROL, AND AIRCRAFT

(71) Applicant: Guangzhou Xaircraft Technology Co., Ltd., Guangdong (CN)

(72) Inventor: Liqiang Zheng, Guangdong (CN)

(73) Assignee: GUANGZHOU XAIRCRAFT TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 16/754,330

(22) PCT Filed: Jul. 25, 2019

(86) PCT No.: PCT/CN2019/097639
§ 371 (c)(1),
(2) Date: Apr. 7, 2020

(87) PCT Pub. No.: WO2020/034820
PCT Pub. Date: Feb. 20, 2020

(65) Prior Publication Data
US 2020/0333806 A1    Oct. 22, 2020

(30) Foreign Application Priority Data

Aug. 15, 2018 (CN) .......................... 201810931105.7

(51) Int. Cl.
*G05D 1/10* (2006.01)
*G01S 17/933* (2020.01)

(52) U.S. Cl.
CPC ............ *G05D 1/106* (2019.05); *G01S 17/933* (2013.01)

(58) Field of Classification Search
CPC ........................ G05D 1/106; G01S 17/88–933
See application file for complete search history.

(56) References Cited

U.S. PATENT DOCUMENTS

2007/0252748 A1  11/2007  Rees et al.
2010/0292871 A1  11/2010  Schultz et al.
(Continued)

FOREIGN PATENT DOCUMENTS

CN  106228131 A  12/2016
CN  107169986 A   9/2017
(Continued)

OTHER PUBLICATIONS

International Search Report dated Sep. 23, 2019 for corresponding International Application No. PCT/CN2019/097639, filed Jul. 25, 2019.
(Continued)

*Primary Examiner* — Aaron L Troost
(74) *Attorney, Agent, or Firm* — David D. Brush; Westman, Champlin & Koehler, P.A.

(57) ABSTRACT

A method and a device for obstacle or ground recognition and flight control, and an aircraft. The method for obstacle or ground recognition includes: determining point cloud data of a region in front of an aircraft; dividing the region in front into several subareas, determining an altitude of each of the subregions based on the point cloud data in each of the subregions; performing linear fitting on the altitudes of the several subregions, and determining whether an obstacle and/or ground is present in the front region according to the fitting result.

20 Claims, 6 Drawing Sheets

```
point cloud data of a region in front of a plant protection drone   — S510
                          ↓
dividing the front region into several subregions, and determining
the altitude of each of the subregions based on the point cloud
data in each of the subregions                                       — S520
                          ↓
performing linear fitting on the altitudes of the several subregions,
and determining whether an obstacle and/or ground is present in
the front region according to the fitting result                     — S530
```

(56) References Cited

U.S. PATENT DOCUMENTS

| | | | |
|---|---|---|---|
| 2013/0191016 A1 | 7/2013 | Baillon et al. | |
| 2013/0257852 A1* | 10/2013 | Meeker | G01S 17/933 |
| | | | 345/419 |
| 2016/0210863 A1 | 7/2016 | Kohn-Rich | |
| 2017/0116487 A1 | 4/2017 | Yamazaki et al. | |
| 2018/0196435 A1 | 7/2018 | Kunzi et al. | |
| 2019/0035291 A1* | 1/2019 | Saxena | G01S 17/87 |
| 2019/0129039 A1* | 5/2019 | Schubert | G08G 5/006 |

FOREIGN PATENT DOCUMENTS

| | | |
|---|---|---|
| GN | 104169986 A | 9/2017 |
| GN | 107588760 A | 1/2018 |
| GN | 109144097 A | 1/2019 |

OTHER PUBLICATIONS

Written Opinion of the International Searching Authority dated Oct. 22, 2019 for corresponding International Application No. PCT/CN2019/097639, filed Jul. 25, 2019.

English translation of the Written Opinion of the International Searching Authority dated Oct. 22, 2019 for corresponding International Application No. PCT/CN2019/097639, filed Jul. 25, 2019.

Chinese Office Action dated Dec. 31, 2019 for corresponding Chinese Application No. 201810931105.7.

English translation of the Chinese Office Action dated Dec. 31, 2019 for corresponding Chinese Application No. 201810931105.7.

Ye Lan et al., "Research on Power Line Extraction and Fitting Based on LIDAR Point Cloud Data", Survey Plotting and spatial geographic information, vol. 33, No. 5, p. 30-34, Oct. 31, 2010. English Abstract p. 30.

Li Liang et al., "Algorithm and Implementation of Gross Error Elimination of Terrain Survey Data by 3D Laser Scanning", Surveying and Mapping Science, vol. 34, No. 3, pp. 187-189. May 31, 2010. English Abstract p. 189.

Office Action dated Jan. 14, 2021 for corresponding Australian Application No. 2019321145.

Aguilar W. G. et al., "Obstacle Avoidance Based-Visual Navigation for Micro Aerial Vehicles", Jan. 19, 2017, Electronics 2017, 6, 10; doi:10.3390/electronics6010010.

Seo, J. et al., "Collision Avoidance Strategies for Unmanned Aerial Vehicles in Formation Flight", IEEE Transactions on Aerospace and Electronic Systems, vol. 56, Issue 6, Dec. 2017, pp. 2718-2734.

Office Action dated Apr. 23, 2021 for related Indian Application No. 202037013281.

\* cited by examiner

METHOD AND DEVICE FOR OBSTACLE OR GROUND RECOGNITION AND FLIGHT CONTROL, AND AIRCRAFT

CROSS-REFERENCE TO RELATED APPLICATION

This application is a U.S. national phase application of International Application PCT/CN2019/097639 filed on Jul. 25, 2019, which published as WO 2020/034820 on Feb. 20, 2020 and which claims priority to Chinese patent application No. 201810931105.7 filed on Aug. 15, 2018, the entire contents of which are incorporated by reference herein.

TECHNICAL FIELD

The present disclosure relates to aircraft technologies, and more particularly to a method, a device, an equipment for obstacle or ground recognition and flight control, and a medium.

BACKGROUND

With the popularity of aircrafts, more and more people are beginning to know and use aircrafts. At present, civil aircrafts are mainly divided into consumer-class aircrafts and industry-class (profession-class) aircrafts. These two types of aircrafts are usually under manual or automatic control, to accurately control the aircraft to complete some flight tasks. These flight tasks include spraying operations, aerial photography, line patrol, reconnaissance survey, measurement, cargo delivery and so on.

During the operation of the aircraft, the detection device at the bottom of the aircraft may be used to keep the aircraft at a set distance from the ground, thereby realizing terrain simulation flying, and the detection device in the front of the aircraft is used to determine whether there is an obstacle in front of the aircraft. When it is recognized that an obstacle is present in front of the aircraft, the obstacle avoidance operation is performed.

However, during the flying of the aircraft, when it is determined by the detection device in the front of the aircraft that a slope of the ground in front of the aircraft is within a set range, the aircraft may treat it as an obstacle to perform the obstacle avoidance operation, although the aircraft may perform the terrain simulation flying. Therefore, since the aircraft cannot accurately recognize the obstacle or ground in front of the aircraft, it leads to conflicts between the terrain simulation flying and the obstacle avoidance operation, which affects work process and work efficiency.

SUMMARY

In a first aspect, a method for obstacle or ground recognition is provided by the present disclosure. The method includes: determining point cloud data of a region in front of an aircraft; dividing the front region into several subregions, and determining an altitude of each of the subregions according to the point cloud data in each of the subregions; and performing linear fitting on the altitudes of the several subregions, and determining whether an obstacle and/or ground is present in the front region according to a fitting result.

In a second aspect, a device for obstacle or flight control is also provided by the present disclosure. The device includes a memory, a processor, and a computer program stored on the memory and executable on the processor. The program is configured to, when executed by the processor, cause the processor to carry out the method for obstacle or ground recognition provided by the present disclosure.

In a third aspect, an aircraft is provided. The aircraft includes a detection device, and a controller. The detection device is disposed in the front of the aircraft and is configured to obtain raw data in a region in front of the aircraft. The controller is configured to receive the raw data, to calculate point cloud data in the front region based on the raw data, to divide the front region into several subregions, to determine an altitude of each of the subregions according to the point cloud data in each of the subregions, to perform linear fitting on the altitudes of the several subregions, and to determine whether an obstacle and/or ground is present in the front region according to a fitting result.

In a fourth aspect, a computer-readable storage medium is also provided by the present disclosure. The computer-readable storage medium has stored a computer program thereon. The program is configured to, when executed by a processor, carry out the method for obstacle or ground recognition provided by the present disclosure.

DETAILED DESCRIPTION

Figure 1:
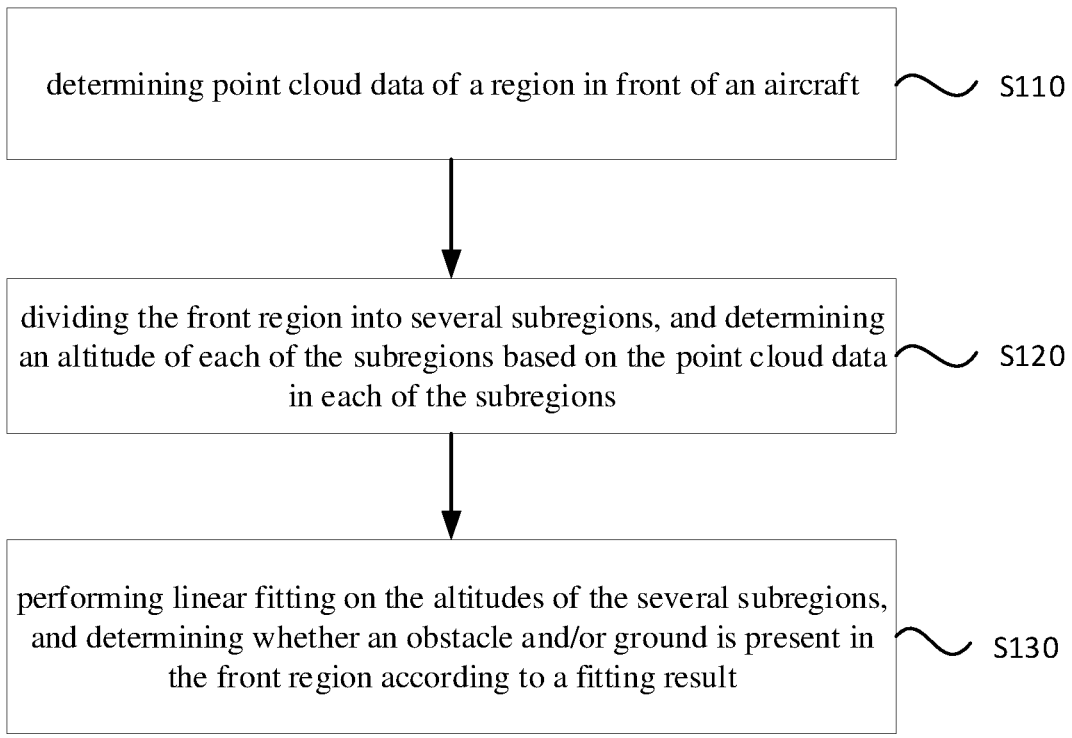
FIG. 1 is a flowchart of a method for obstacle or ground recognition provided by the present disclosure.

The present disclosure is further described in detail below in conjunction with the accompanying drawings. It may be understood that what is described herein is only used to explain the present disclosure, rather than limiting the present disclosure. It should also be noted that, for the convenience of description, only some parts related to the present disclosure are shown in the drawings instead of the whole structure.

FIG. 1 is a flowchart of a method for obstacle or ground recognition provided by the present disclosure. The method for obstacle or ground recognition is performed by a device for obstacle or ground recognition, which is implemented in software and/or hardware. The device for obstacle or ground recognition may be configured in the aircraft, and may also be configured in a device that may communicate with the aircraft, for example, a terminal, a server, or the like. The terminal may be a smart phone, a tablet computer, a smart remote control, or the like. The server may be a cloud server or other type of server. The aircraft may be a drone, wherein the drone may be a plant protection drone.

The method provided by the present disclosure may be applied to a scenario where a suspected obstacle is detected to be present in a region in front of an aircraft, and in particular to a scenario where a suspected obstacle is detected to be present in a region in front of an aircraft when the aircraft performs works such as spraying, aerial photography and cruising on the plants. Among them, the suspected obstacle may be understood as being an actual obstacle or not. For example, when a ramp is present in the region in front of the aircraft, and the slope of the ramp is within a certain range, the aircraft may detect the ramp as the suspected obstacle by a detection device.

In the related art, the ramp is regarded as an actual obstacle by the aircraft, such that obstacle avoidance operation is performed. However, the slope of the ramp is not too large, and the aircraft might have performed the terrain simulation flying. However, since the ramp is regarded as the actual obstacle by the aircraft, the obstacle avoidance operation is actually performed. Therefore, the method for recognizing the obstacle or ground in the region in front of the aircraft in the related art is not suitable, which easily leads to conflicts between the terrain simulation flying and obstacle avoidance operation. The method provided by the present disclosure may further recognize the obstacle or ground in the region in front of the aircraft, thereby avoiding conflicts between the terrain simulation flying and obstacle avoidance operation.

As illustrated in FIG. 1, the technical solution provided by the present disclosure includes followings.

At block S110, point cloud data of a region in front of an aircraft is determined.

In the present disclosure, the aircraft may be a drone, or other types of aircrafts. The drone may be a plant protection drone.

During the flying of the aircraft, the region in front of the aircraft may be detected by the detection device, so that the obstacle and/or ground in the region in front of the aircraft is determined. The detection device may include, but is not limited to, a multi-line LIDAR, a binocular ranging sensor, a depth image (RGB-D) ranging sensor and the like. The detection device may be installed in the front of the aircraft. The detection device may be turned on and off on the basis of actual working conditions. For example, when the aircraft is initiated, the detection device may be turned on, and when the aircraft completes the working task, the detection device may be turned off. The detection device may also be used together with other sensing devices, for example, the detection device may be turned on when a complex scenario is detected by other sensing devices.

During the flying of the aircraft, raw data of the region in front of the aircraft may be obtained by the detection device, and the point cloud data of the front region may be calculated from the raw data. For example, when the multi-line LIDAR is used for detection, the distance from an object to the aircraft may be detected by the multi-line LIDAR. Position information for each point on the object may be determined based on the distance from the object to the aircraft, the angle of the detection beam emitted by the LIDAR and the position of the aircraft. The position information for each point on the object may include latitude and longitude coordinates as well as the height of the object. The position information for each point on the object may also be converted to the body coordinate system through coordinate conversion, such that the position information for each point on the object in the body coordinate system is determined. The horizontal plane of the centerline axis of the fuselage may be a plane coordinate system including X and Y axes and the vertical plane may be used as Z axis to obtain the body coordinate system. The point cloud data is formed by the position information for each point on the object. The raw data may be the angle of the scanning beam emitted by the LIDAR, the distance between the aircraft and the object detected by the scanning beam, and the like.

For another example, if an RGB-D ranging sensor is used for detection, the distance between each point on the object in the front region and the aircraft may be determined according to a depth of the captured image, and the conversion relationship between the pixel coordinate system and the body coordinate system may be obtained according to the installation position and angle of the RGB-D ranging sensor on the aircraft. On the basis of the pixel coordinate of each point on the object in the image, the distance between each point on the object and the aircraft, and the conversion relationship between the pixel coordinate system and the body coordinate system, each point on the object may be mapped into the body coordinate system. The raw data may be depth information of the captured image, the installation position and angle of the RGB-D ranging sensor on the aircraft, and the like.

Before determining the point cloud data of the region in front of the aircraft, the method further includes: determining the region in front of the aircraft based on a preset route of the aircraft, a position of the aircraft, and a width of the aircraft, in which the horizontal distance from each point in the front region to the aircraft is within a first set distance range, and the vertical distance from each point in the front region to the aircraft is within a second set distance range. Therefore, the front region may be a space region. When the obstacle or ground recognition is performed, the front region may be mapped into a two-dimensional map, and the information such as colors may be used to characterize the altitude of the obstacle or each point of the ground in the front region, which facilitate processing data, in which the body coordinate system, the world coordinate system, or other coordinate systems may be used as a coordinate system of the two-dimensional map.

During the flying of the aircraft, more point cloud data in front of the aircraft may be detected by the detection device in the front of the aircraft, but only obstacles in the region in front of the aircraft may affect the flying of the aircraft. Alternatively, determining point cloud data of the region in front of the aircraft includes: determining the point cloud data of the detection region of the aircraft, and filtering out the point cloud data outside the front region to obtain the point cloud data of the region in front of the aircraft, in which the detection region is an effective detection range of the aircraft. The front region may be understood as the working region in front of the aircraft. The front region may be obtained by taking the position of the aircraft as a center, the width of the aircraft as the lateral width, and the route of the aircraft as an extending direction of the width. The horizontal distance from each point in the front region to the aircraft is within the first set distance range, and the vertical distance from each point in the front region to the aircraft is within the second set distance range. When filtering out the point cloud data is performed, the point cloud data outside the front region may be filtered out to obtain the point cloud data in the front region. By removing the point cloud data outside the front region and remaining the point cloud data in the front region, the amount of data processing may be reduced and the efficiency of recognition may be improved.

At block S120, the front region is divided into several subregions, and the altitude of each of the subregions is determined according to the point cloud data in each of the subregions.

Figure 2:
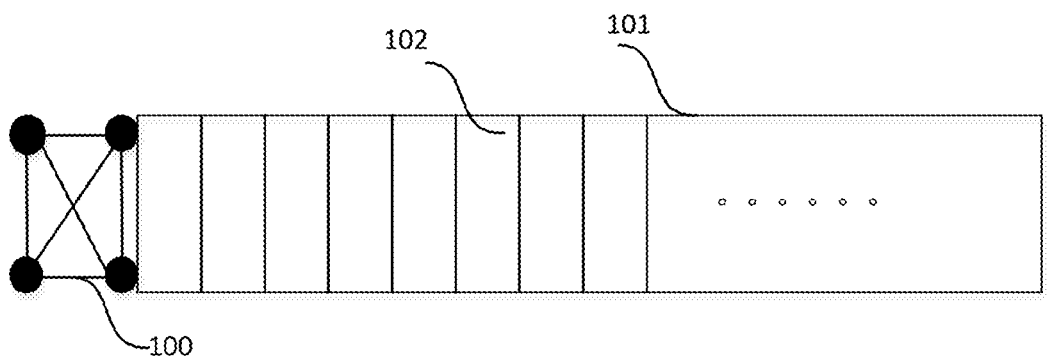
FIG. 2 is a top view of a longitudinally divided region in front of an aircraft provided by the present disclosure.

Dividing the front region into several subregions may include equidistantly dividing the front region into several subregions. That is, the front region may be equidistantly divided into the subregions arranged in order along the heading of the aircraft. FIG. 2 is a top view of a longitudinally divided region in front of an aircraft. As illustrated in FIG. 2, the widths of respective subregions 102 in the front region 101 of the aircraft 100 are the same, in which the subregions 102 are arranged in order along the heading of the aircraft.

In this step, the obtained point cloud data of the region in front of the aircraft is matched to the corresponding subregion, and the altitude of each of the subregions is determined on the basis of the point cloud data in the subregion. Determining the altitude of each of the subregions on the basis of the point cloud data in each of the subregions may include: storing the point cloud data into arrays of the respective subregions; for each subregion, removing a set number of point cloud data from the array of the subregion based on a descending order of altitudes; determining an average altitude on the basis of the remaining point cloud data in the array; and taking the average altitude as the altitude of the subregion.

The set number may be a value of 1, 2, 3 or the like, which has a certain upper limit. The array of each subregion may be an ordered dynamic array. When the point cloud data is stored into the array of the corresponding subregion, the array orders the point cloud data on the basis of the altitudes. The point cloud data with the altitude greater than a set altitude value in the subregion may also be removed, and an average altitude of the subregion is determined based on the remaining point cloud data and used as the altitude of the subregion. For example, n point cloud data may be sequentially removed based on the descending order of altitudes; and the average altitude is calculated based on the remaining point cloud data and used as the altitude of the subregion. Alternatively, a certain amount of point cloud data may be selected from the remaining point cloud data based on the descending order of altitudes, and the average altitude may be calculated based on the selected point cloud data and used as the altitude of the subregion.

Therefore, by removing the abnormal point cloud data and calculating the altitude based on the remaining point cloud data, the inaccurate point cloud data may be removed and the altitude of the subregion may be accurately obtained, so that the obstacle or ground is accurately recognized. For example, during the flying of the aircraft, in the case where the image is captured by the depth image sensor and the point cloud data of the region in front of the aircraft is calculated, as the sky texture in the image is not accurately recognized when the sky in the front region is captured by the depth image sensor, it is easy to calculate the point cloud data based on the image data of the sky in the image and take this point cloud data as the point cloud data of the obstacle or ground in the region in front of the aircraft, resulting in abnormal point cloud data. Therefore, as the sky's position is higher but is not an obstacle in the front region, the abnormal point cloud data in the image should be removed, that is, the point cloud data with abnormal (higher) altitude should be filtered out, thereby ensuring accurate calculation of the altitude of the subregion. The abnormal situation of the point cloud data is not limited to the above-mentioned situation.

It should be noted that, the method for calculating the altitude of the subregion is not limited to the above-mentioned method, and point cloud data may also be selected as required for calculating the altitude of the subregion. For example, determining the altitude of each of the subregions on the basis of the point cloud data in each of the subregions may further include: storing the point cloud data into the array of the corresponding subregion; determining the average altitude on the basis of all point cloud data in the array; and taking the average altitude as the altitude of the subregion. That is, the average altitude of the subregion may be determined on the basis of all point cloud data in the subregion and used as the altitude of the subregion.

It should be noted that, when the front region is divided, the equidistant division may not be performed. When the front region is equidistantly divided, the calculation efficiency may be improved when performing calculation using the point cloud data within the subregion.

It should be noted that, in FIG. 2, the region in front of the aircraft is exemplarily divided into rectangular subregions, but this is only one example of the present disclosure. In the present disclosure, the shape of subregions may also be square, trapezoidal, semi-circular, or other shapes. However, it may facilitate calculating and improving calculation efficiency when the shape of the subregion is rectangular.

At block S130, linear fitting is performed on the altitudes of the several subregions, and it is determined whether an obstacle and/or ground is present in the front region based on the fitting result.

In this step, linear fitting of the altitudes of the several subregions may be the fitting of the altitudes of several subregions into a straight line. In a set coordinate system, the positions of the several subregions may be determined, and the altitudes of the several subregions may also be determined. The altitudes of the respective subregions may be fitted into a straight line, and the obstacle and/or ground in the region in front of the aircraft may be determined according to the characteristics of the fitted straight line. The specific fitting method and determining method will be described in detail below. In the present disclosure, the region in front of the aircraft is divided into several subregions, the obtained point cloud data of the region in front of the aircraft is matched to the corresponding subregion, and the altitude of the subregion is determined on the basis of the point cloud data in the subregion, and linear fitting of the altitudes of the several subregions is performed, so that the obstacle and/or ground in the region in front of the aircraft is recognized on the basis of the fitting result, which may accurately recognize the obstacle or ground in front of the aircraft, thereby avoiding conflicts between the terrain simulation flying and the obstacle avoidance operation, thereby improving work efficiency.

Figure 3:
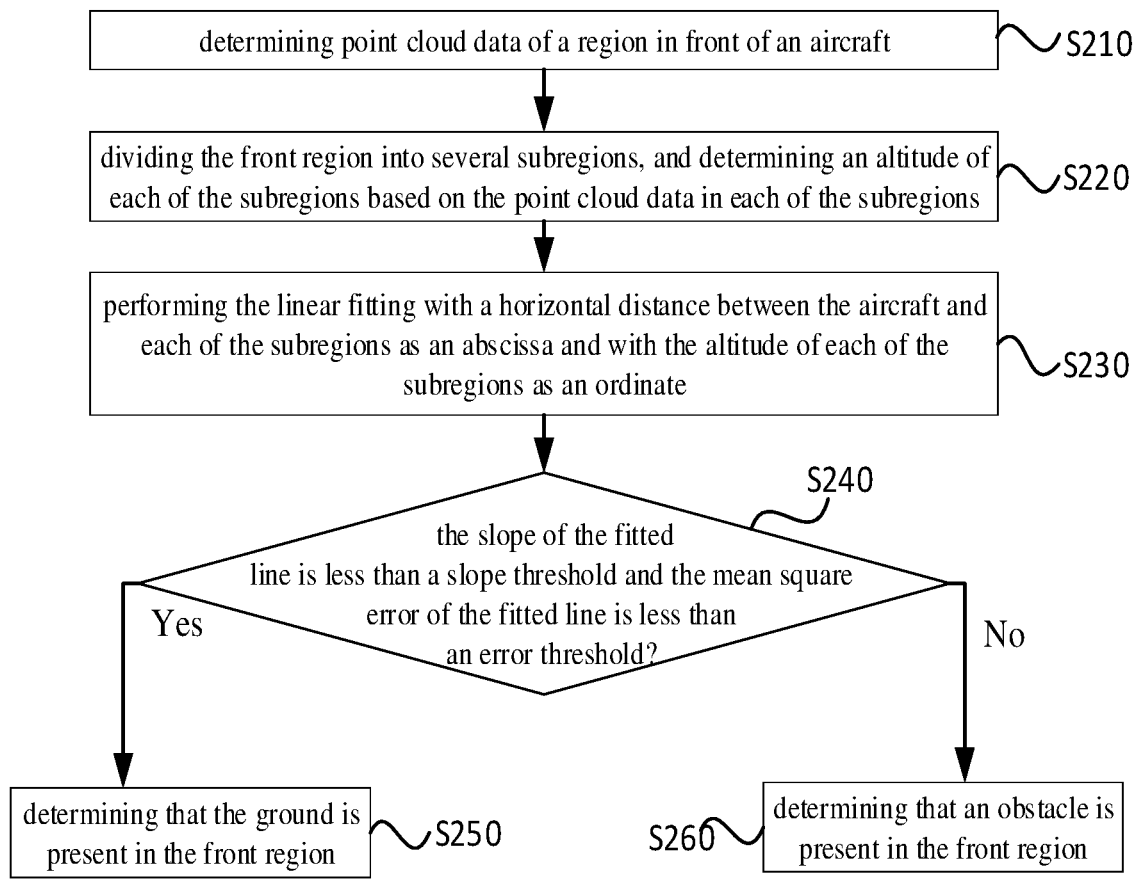
FIG. 3 is a flowchart of another method for obstacle or ground recognition provided by the present disclosure.

FIG. 3 is a flowchart of a method for obstacle or ground recognition provided by the present disclosure, where the altitudes of the several subregions are directly fitted. As illustrated in FIG. 3, the technical solution provided by the present disclosure includes followings.

At block S210, point cloud data of a region in front of an aircraft is determined.

At block S220, the front region is divided into several subregions, and the altitude of each of the subregions is determined based on the point cloud data in each of the subregions.

At block S230, a linear fitting is performed with a horizontal distance between the aircraft and each of the subregions as an abscissa and with the altitude of each of the subregions as an ordinate.

In this step, the horizontal distance between the aircraft and each of the subregions may be understood as the horizontal distance from the aircraft to the center of each of the subregions, and may also be understood as the horizontal distance from the aircraft to the set position of each of the subregions.

In this step, a least square method may be used for linearly fitting, and of course, other methods may also be used for linearly fitting. For example, the horizontal distance between each of the subregions and the aircraft is taken as the abscissa, and the altitude of the subregion is taken as the ordinate, and thus a linear equation may be listed.

The coordinate of the first subregion is $(x_1, y_1)$, the coordinate of the second subregion is $(x_2, y_2)$, and so on, the coordinate of the n-th small region is $(x_n, y_n)$.

Let $A=(a, b)$, $$X = \begin{pmatrix} x_1 & x_2 & \ldots & x_n \\ 1 & 1 & \ldots & 1 \end{pmatrix},$$

$Y=(y_1, y_2, \ldots, y_n)$, $A=YX^T(XX^T)^{-1}$ is obtained using the least squares method, where the mean square error is $\Sigma=(Y-AX)(Y-AX)^T$.

On the basis of the above method, the slope of the fitted line may be calculated, and the mean square error of the fitted line may also be calculated.

At block S240, it is determined whether the slope of the fitted line is less than a slope threshold and whether the mean square error of the fitted line is less than an error threshold.

If yes, S250 is performed; if no, S260 is performed.

At block S250, it is determined that the ground is present in the front region.

At block S260, it is determined that that an obstacle is present in the front region.

In the present disclosure, the mean square error is used to evaluate the fitting degree of the altitude of the subregion. The smaller the mean square error, the better the fitting degree of the altitude of the subregion. When the slope of the fitted line is less than the slope threshold, and the mean square error of the fitted line is less than the error threshold, it is determined that the ground is present in the front region; otherwise, it is determined that an obstacle is present in the front region, in which the ground includes a plane or a ramp with a slope less than the set value.

It should be noted that if the slope of the ramp in the region in front of the aircraft is greater than the set value, the ramp is treated by the aircraft as an obstacle, so that obstacle avoidance operation may be performed to ensure normal flight.

Therefore, by determining the obstacle or ground in the region in front of the aircraft based on the slope and the mean square error of the fitted line, whether the obstacle or ground is present in the front region may be accurately recognized.

Figure 4:
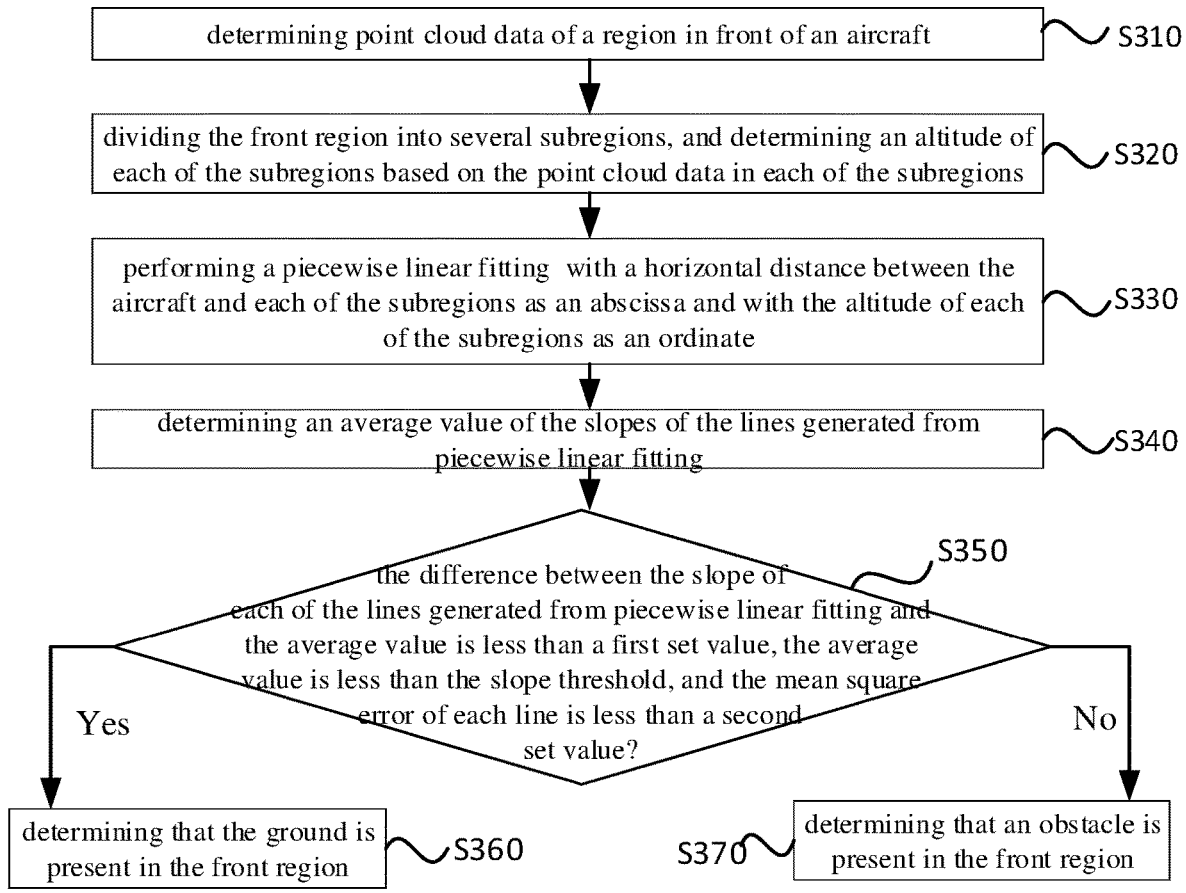
FIG. 4 is a flowchart of further another method for obstacle or ground recognition provided by the present disclosure.

FIG. 4 is a method for obstacle or ground recognition provided by the present disclosure, where a piecewise linear fitting is performed on the altitudes of the several subregions. As illustrated in FIG. 4, the technical solution provided by the present disclosure includes followings.

At block S310, point cloud data of a region in front of an aircraft is determined.

At block S320, the front region is divided into several subregions, and the altitude of each of the subregions is determined based on the point cloud data in each of the subregions.

At block S330, a piecewise linear fitting is performed with a horizontal distance between the aircraft and each of the subregions as an abscissa and with the altitude of each of the subregions as an ordinate.

In this step, the horizontal distance between the aircraft and each of the subregions may be understood as the horizontal distance from the aircraft to the center of each of the subregions, and may also be understood as the horizontal distance from the aircraft to the set position of each of the subregions.

The piecewise linear fitting may be dividing all subregions into a number of parts, and performing a linear fitting for each part with the horizontal distance between the aircraft and the subregion as the abscissa and with the altitude of the subregion as the ordinate, which may obtain several fitted lines. For each part, the method for linear fitting may be the same as the method for linear fitting as described above, which will not be elaborated.

At block S340, an average value of the slopes of the lines generated from the piecewise linear fitting is determined.

In this step, the average value of the slopes of the lines generated from the piecewise linear fitting is obtained by calculating a sum of the slopes of the lines generated from the piecewise linear fitting and dividing the sum by the number of the lines generated from the piecewise linear fitting.

At block S350, it is determined whether the difference between the slope of each of the lines generated from the piecewise linear fitting and the average value is less than a first set value, whether the average value is less than the slope threshold, and whether the mean square error of each of the lines generated from the piecewise linear fitting is less than a second set value.

If yes, S360 is performed; if no, S370 is performed.

At block S360, it is determined that the ground is present in the front region.

At block S370, it is determined that that an obstacle is present in the front region.

In the present disclosure, when the difference between the slope of each line generated from the piecewise linear fitting and the average value of the slopes is less than the first set value, it indicates that the slopes of the lines generated from the piecewise linear fitting do not change much, thereby indicating there are no obvious protrusions in the region in front of the aircraft; when the average value of the slopes is less than the slope threshold, it indicates that there is an object with a small slope in the region in front of the aircraft; and when the mean square error of each of the lines generated from the piecewise linear fitting is less than the second set value, it indicates that the fitting degree of each of the lines generated from piecewise linear fitting is better.

When the difference between the slope of each of the lines generated from piecewise linear fitting and the average value is less than the first set value, the average value of the slopes is less than the slope threshold, and the mean square error of each of the lines generated from piecewise linear fitting is less than the second set value, it is determined that the ground is present in the front region, in which the ground includes a plane or a ramp with a slope less than the set value. Otherwise, when not all the above three conditions are met, it is determined that the obstacle is present in the front region, in which the obstacle may be a ramp with a slope greater than the set value and other obstacle.

Therefore, it may be accurately recognized whether the obstacle or ground is present in the front region through a piecewise linear fitting and through determining the obstacle or ground in the region in front of the aircraft based on the slope and the mean square error of each line generated from the piecewise linear fitting.

Figure 5:
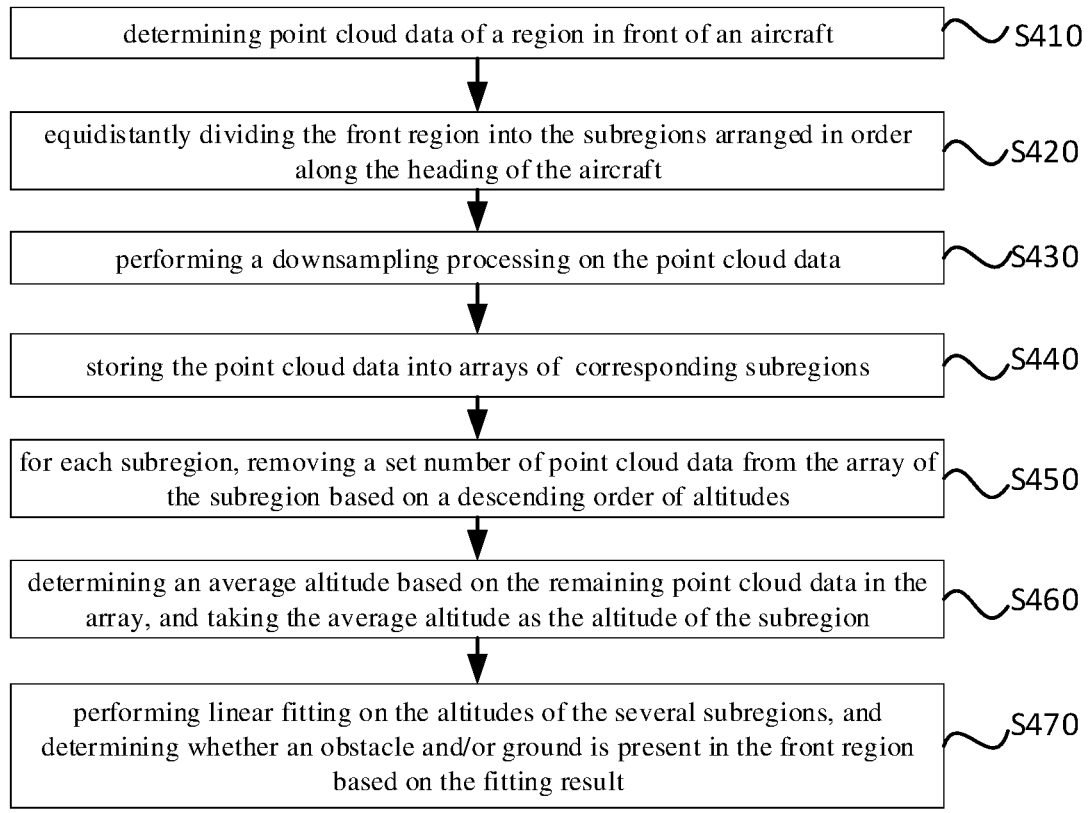
FIG. 5 is a flowchart of yet another method for obstacle or ground recognition provided by the present disclosure.

FIG. 5 is a flowchart of a method for obstacle or ground recognition provided by the present disclosure. As illustrated in FIG. 5, the technical solution provided by the present disclosure includes followings.

At block S410, point cloud data of a region in front of an aircraft is determined.

At block S420, the front region is equidistantly divided into the subregions arranged in order along the heading of the aircraft.

At block S430, a downsampling processing is performed on the point cloud data.

In this step, the downsampling processing on the point cloud data may be a process of diluting the point cloud data and reducing the amount of point cloud data, thereby reducing the amount of data processing and improving the efficiency.

At block S440, the point cloud data is stored into arrays of corresponding subregions.

At block S450, for each subregion, a set amount of point cloud data is removed from the array of the subregion based on a descending order of altitudes.

At block S460, an average altitude is determined based on the remaining point cloud data in the array and the average altitude is taken as the altitude of the subregion.

At block S470, the altitudes of the several subregions are fitted, and it is determined whether an obstacle and/or ground is present in the front region based on the fitting result.

The specific implementation in step 470 may be as described above.

Figure 6:
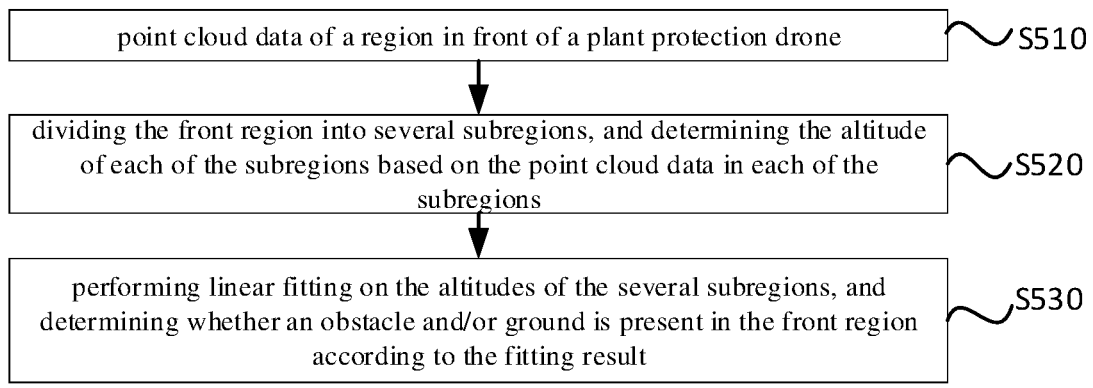
FIG. 6 is a flowchart of yet another method for obstacle or ground recognition provided by the present disclosure.

FIG. 6 is a flowchart of a method for obstacle or ground recognition provided by the present disclosure. In the present disclosure, the aircraft is preferably a plant protection drone, and the method provided by the present disclosure is applied to the scenario where plant protection drone is working.

As illustrated in FIG. 6, the technical solution provided by the present disclosure includes followings.

At block S510, point cloud data of a region in front of the plant protection drone is determined.

At block S520, the front region is divided into several subregions and the altitude of each of the subregions is determined based on the point cloud data in each of the subregions.

At block S530, linear fitting is performed on the altitudes of the several subregions, and it is determined whether an obstacle and/or ground is present in the front region based on the fitting result.

The specific implementation of the steps in this embodiment is the same as the implementation of the corresponding steps in the above embodiments, which is not repeated again.

Using the above method, the plant protection drone may accurately recognize the obstacle and/or ground in the front region during working, thereby avoiding conflicts between the terrain simulation flying and obstacle avoidance operation, thereby improving work efficiency.

Figure 7:
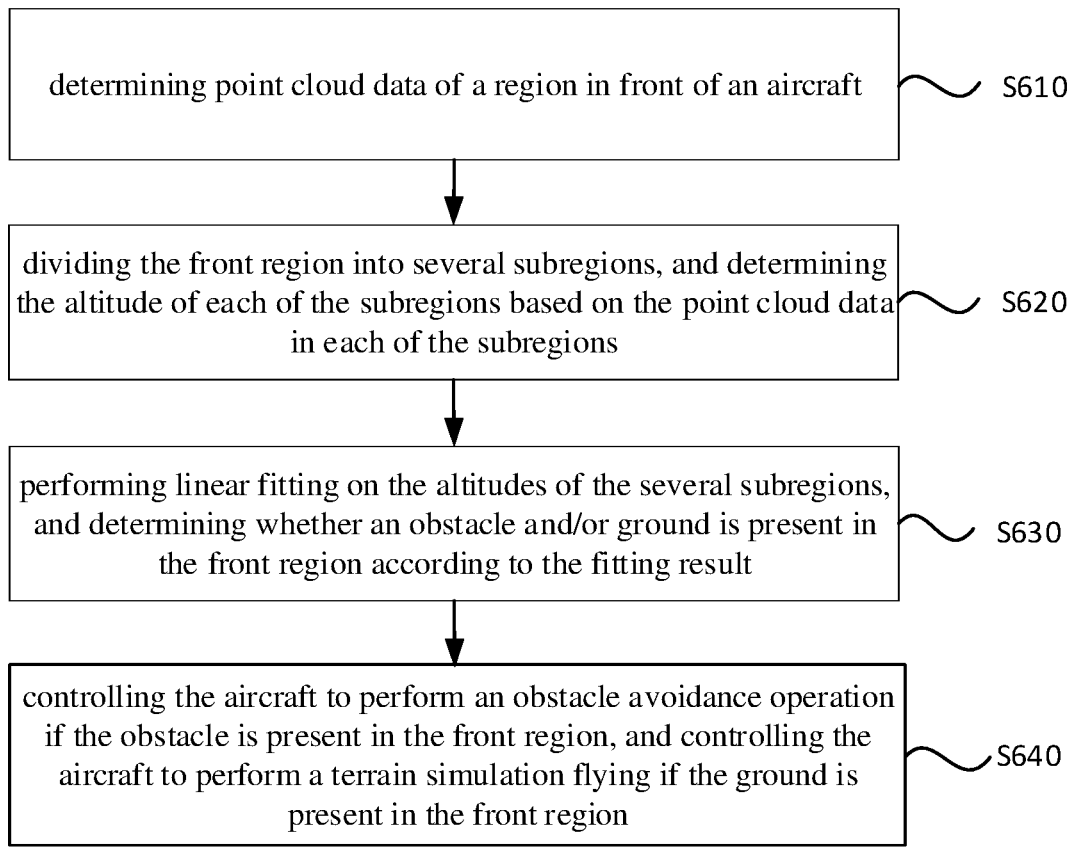
FIG. 7 is a flowchart of a method for flight control provided by the present disclosure.

FIG. 7 is a flowchart of a method for flight control provided by the present disclosure. The method is performed by a flight control device, which is implemented in software and/or hardware. The device may be configured in an aircraft or may be configured in a device that may communicate with the aircraft, for example, a terminal, a server, or the like. The terminal may be a smart phone, a tablet computer, a smart remote control, or the like. The server may be a cloud server or another type of server. The aircraft may be a drone.

The method provided by the present disclosure may be applied to the scenario where a suspected obstacle is detected to be present in the region in front of the aircraft, and in particular to the scenario where the suspected obstacle is detected to be present in the region in front of the aircraft when the aircraft performs the works such as spraying, aerial photography and cruising on the plants. Among them, the suspected obstacle may be understood as being a real obstacle or not. For example, when a ramp is present in the region in front of the aircraft, and the slope of the ramp is within a certain range, the aircraft may detect the ramp as the suspected obstacle by the detection device.

In the related art, the ramp is regarded as a real obstacle by the aircraft, so that obstacle avoidance operation is performed. However, the slope of the ramp is not too large, and the aircraft might have performed the terrain simulation flying. However, since the ramp is regarded as a real obstacle by the aircraft, an obstacle avoidance operation is actually performed, which is easy to cause conflicts between the terrain simulation flying and obstacle avoidance operation. The method provided by the present disclosure may further recognize the obstacle or ground in the region in front of the aircraft, thereby avoiding conflicts between the terrain simulation flying and obstacle avoidance operation.

As illustrated in FIG. 7, the technical solution provided by the present disclosure includes followings.

At block S610, point cloud data of a region in front of an aircraft is determined.

At block S620, the front region is divided into several subregions and the altitude of each of the subregions is determined based on the point cloud data in each of the subregions.

At block S630, linear fitting is performed on the altitudes of the several subregions, and it is determined whether an obstacle and/or ground is present in the front region based on the fitting result.

At block S640, the aircraft is controlled to perform an obstacle avoidance operation if the obstacle is present in the front region, and the aircraft is controlled to perform a terrain simulation flying if the ground is present in the front region.

The terrain simulation flying may be that the aircraft is controlled to maintain flying with a set vertical distance from the ground, and other parameters may also be controlled as required, for example the angle between the aircraft and the ground. The process of obstacle avoidance operation may be that the parameter information of the obstacle is determined, and the flight path, the speed of the aircraft, and the attitude of the aircraft are planned based on the parameter information of the obstacle, the distance between the obstacle and the aircraft and the like. The process of obstacle avoidance operation is not limited to the above-mentioned process, and may also be other ways.

Performing linear fitting on the altitudes of the several subregions includes: performing the linear fitting with a horizontal distance between the aircraft and each of the subregions as an abscissa and with the altitude of each of the subregions as an ordinate.

Determining whether an obstacle and/or ground is present in the front region based on the fitting result includes: when the slope of the fitted line is less than a slope threshold, and the mean square error of the fitted line is less than an error threshold, determining that the ground is present in the front region; otherwise, determining that an obstacle is present in the front region.

Performing linear fitting on the altitudes of the several subregions includes: performing a piecewise linear fitting with a horizontal distance between the aircraft and each of the subregions as an abscissa and with the altitude of each of the subregions as an ordinate.

Determining whether an obstacle and/or ground is present in the front region based on the fitting result includes: determining an average value of the slopes of the lines generated from piecewise linear fitting; if the difference between the slope of each of the lines generated from piecewise linear fitting and the average value is less than a first set value, the average value is less than the slope threshold, and the mean square error of each of the lines generated from piecewise linear fitting is less than a second set value, determining that the ground is present in the front region; otherwise, determining that the obstacle is present in the front region.

Dividing the front region into several subregions includes: equidistantly dividing the front region into the subregions arranged in order along the heading of the aircraft.

Determining the altitude of each of the subregions based on the point cloud data in each of the subregions includes: storing the point cloud data into arrays of the respective subregions; for each subregion, removing a set number of point cloud data from the array of the subregion based on a descending order of altitudes; determining an average altitude based on the remaining point cloud data in the array; and taking the average altitude as the altitude of the subregion.

Determining the altitude of each of the subregions based on the point cloud data in each of the subregions includes: storing the point cloud data into arrays of the respective subregions; for each subregion, determining an average altitude based on all point cloud data in the array; and taking the average altitude as the altitude of the subregion. Alternatively, before storing the point cloud data into arrays of the respective subregions, the method further includes: performing a downsampling processing on the point cloud data.

The method further includes: determining the region in front of the aircraft based on a preset route of the aircraft, a position of the aircraft and a width of the aircraft, in which, the horizontal distance from each point in the front region to the aircraft is within a first set distance range, and the vertical distance from each point in the front region to the aircraft is within a second set distance range.

Determining point cloud data of the region in front of the aircraft, includes: determining point cloud data of a detection region of the aircraft, and filtering out the point cloud data outside the front region to obtain the point cloud data of the region in front of the aircraft, in which the detection region is an effective detection range of the aircraft. Alternatively, the aircraft is a drone.

In the present disclosure, the region in front of the aircraft is divided into several subregions, point cloud data of the region in front of the aircraft is matched to respective subregions, and the altitude of the subregion is determined based on the point cloud data in the subregion, and linear fitting is performed on the altitudes of the several subregions, so that it is determined whether an obstacle and/or ground is present in the front region based on the fitting result. The obstacle or ground in front of the aircraft can be accurately recognized, thereby avoiding conflicts between the terrain simulation flying and obstacle avoidance operation, thereby improving work efficiency.

Figure 8:
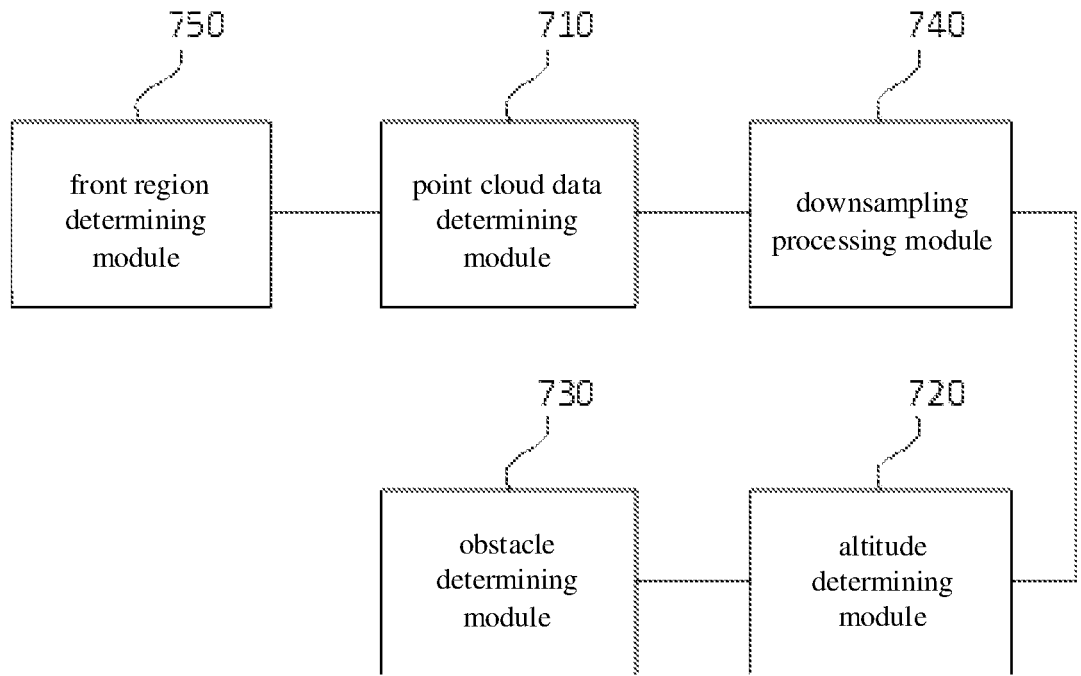
FIG. 8 is a block diagram of a device for obstacle or ground recognition provided by the present disclosure.

FIG. 8 illustrates a device for obstacle or ground recognition provided by the present disclosure. As illustrated in FIG. 8, the device provided by the present disclosure includes a point cloud data determining module 710, an altitude determining module 720, and an obstacle determining module 730.

The point cloud data determining module 710 is configured to determine point cloud data of a region in front of an aircraft.

The altitude determining module 720 is configured to divide the front region into several subregions, and determine the altitude of each of the subregions based on the point cloud data in each of the subregions.

The obstacle determining module 730 is configured to perform linear fitting on the altitudes of the several subregions, and determine whether an obstacle and/or ground is present in the front region based on the fitting result.

Performing linear fitting on the altitudes of the several subregions includes: performing a piecewise linear fitting with a horizontal distance between the aircraft and each of the subregions as an abscissa and with the altitude of each of the subregions as an ordinate.

Determining whether an obstacle and/or ground is present in the front region based on the fitting result includes: determining an average value of the slopes of the lines generated from piecewise linear fitting; if the difference between the slope of each of the lines generated from piecewise linear fitting and the average value is less than a first set value, the average value is less than the slope threshold, and the mean square error of each of the lines generated from piecewise linear fitting is less than a second set value, determining that the ground is present in the front region; otherwise, determining that the obstacle is present in the front region.

Dividing the front region into several subregions includes: equidistantly dividing the front region into the subregions arranged in order along the heading of the aircraft.

Determining the altitude of each of the subregions based on the point cloud data in each of the subregions includes: storing the point cloud data into arrays of the respective subregions; for each subregion, removing a set number of point cloud data from the array of the subregion based on a descending order of altitudes; determining an average altitude based on the remaining point cloud data in the array; and taking the average altitude as the altitude of the subregion.

Determining the altitude of each of the subregions based on the point cloud data in each of the subregions includes: storing the point cloud data into arrays of the respective subregions; for each subregion, determining an average altitude based on all point cloud data in the array; and taking the average altitude as the altitude of the subregion.

The device further includes a downsampling processing module 740. The downsampling processing module 740 is configured to perform a downsampling processing on the point cloud data before the point cloud data is stored into the arrays of the respective subregions.

The device further includes a front region determining module 750. The front region determining module 750 is configured to determine the region in front of the aircraft based on a preset route of the aircraft, a position of the aircraft, and a width of the aircraft, in which the horizontal distance from each point in the front region to the aircraft is within a first set distance range, and the vertical distance from each point in the front region to the aircraft is within a second set distance range.

The point cloud data determining module 710 is configured to determine point cloud data of a detection region of the aircraft, and filter out the point cloud data outside the front region to obtain the point cloud data of the region in front of the aircraft, in which the detection region is an effective detection range of the aircraft. Alternatively, the aircraft is a drone.

The above device may perform the method for obstacle or ground recognition provided by the present disclosure, and has function modules and beneficial effects corresponding to executing the method for obstacle or ground recognition.

Figure 9:
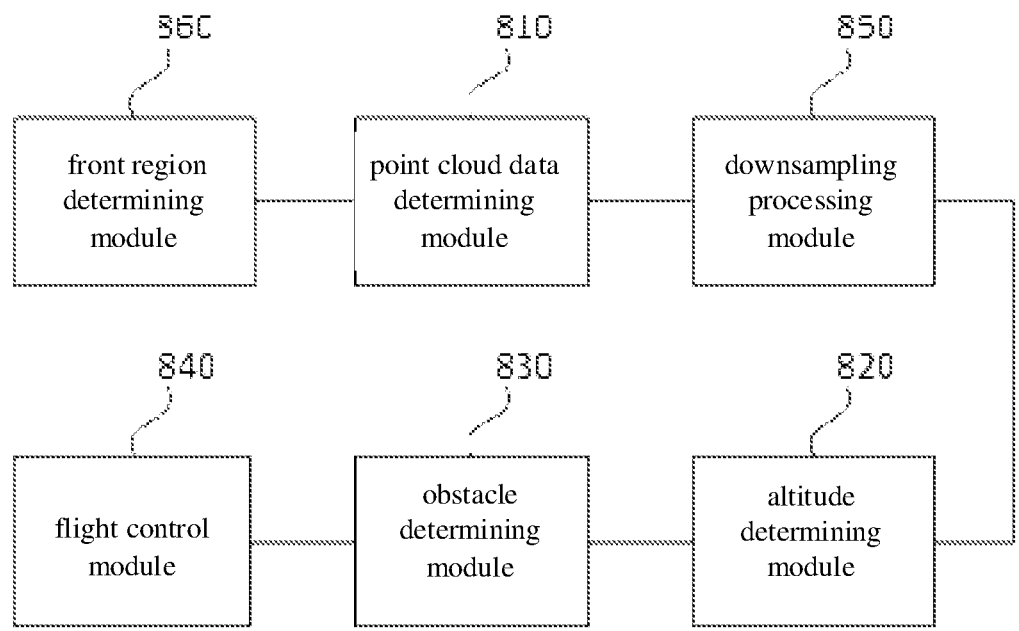
FIG. 9 is a block diagram of a device for flight control provided by the present disclosure.

FIG. 9 illustrates a device for flight control provided by the present disclosure. As illustrated in FIG. 9, the device provided by the present disclosure includes: a point cloud data determining module 810, an altitude determining module 820, an obstacle determining module 830, and a flight control module 840.

The point cloud data determining module 810 is configured to determine point cloud data of a region in front of an aircraft. The altitude determining module 820 is configured to divide the front region into several subregions, and determine the altitude of each of the subregions based on the point cloud data in each of the subregions. The obstacle determining module 830 is configured to perform linear fitting on the altitudes of the several subregions, and determine whether an obstacle and/or ground is present in the front region based on the fitting result. The flight control module 840 is configured to control the aircraft to perform an obstacle avoidance operation if the obstacle is present in the front region, and control the aircraft to perform a terrain simulation flying if the ground is present in the front region.

Performing linear fitting on the altitudes of the several subregions includes: performing a piecewise linear fitting with a horizontal distance between the aircraft and each of the subregions as an abscissa and with the altitude of each of the subregions as an ordinate.

Determining whether an obstacle and/or ground is present in the front region based on the fitting result includes: determining an average value of the slopes of the lines generated from piecewise linear fitting; if the difference between the slope of each of the lines generated from piecewise linear fitting and the average value is less than a first set value, the average value is less than the slope threshold, and the mean square error of each of the lines generated from piecewise linear fitting is less than a second set value, determining that the ground is present in the front region; otherwise, determining that the obstacle is present in the front region.

Dividing the front region into several subregions includes: equidistantly dividing the front region into the subregions arranged in order along the heading of the aircraft.

Determining the altitude of each of the subregions based on the point cloud data in each of the subregions includes: storing the point cloud data into arrays of the respective subregions; for each subregion, removing a set number of point cloud data from the array of the subregion based on a descending order of altitudes; determining an average altitude based on the remaining point cloud data in the array; and taking the average altitude as the altitude of the subregion.

Determining the altitude of each of the subregions based on the point cloud data in each of the subregions includes: storing the point cloud data into arrays of the respective subregions; for each subregion, determining an average altitude based on all point cloud data in the array; and taking the average altitude as the altitude of the subregion. Alternatively, the device further includes a downsampling processing module 850. The downsampling processing module 850 is configured to perform a downsampling processing on the point cloud data before the point cloud data is stored into the arrays of the corresponding subregions.

The device further includes a front region determining module 860. The front region determining module 860 is configured to determine the region in front of the aircraft based on a preset route of the aircraft, a position of the aircraft, and a width of the aircraft, in which the horizontal distance from each point in the front region to the aircraft is within a first set distance range, and the vertical distance from each point in the front region to the aircraft is within a second set distance range.

The point cloud data determining module 810 is configured to determine the point cloud data of a detection region of the aircraft, and filter out the point cloud data outside the front region to obtain the point cloud data of the region in front of the aircraft, in which the detection region is an effective detection range of the aircraft. Alternatively, the aircraft is a drone.

The above device may perform the method for flight control provided by the present disclosure, and has functional modules and beneficial effects corresponding to executing the method for flight control.

Figure 10:
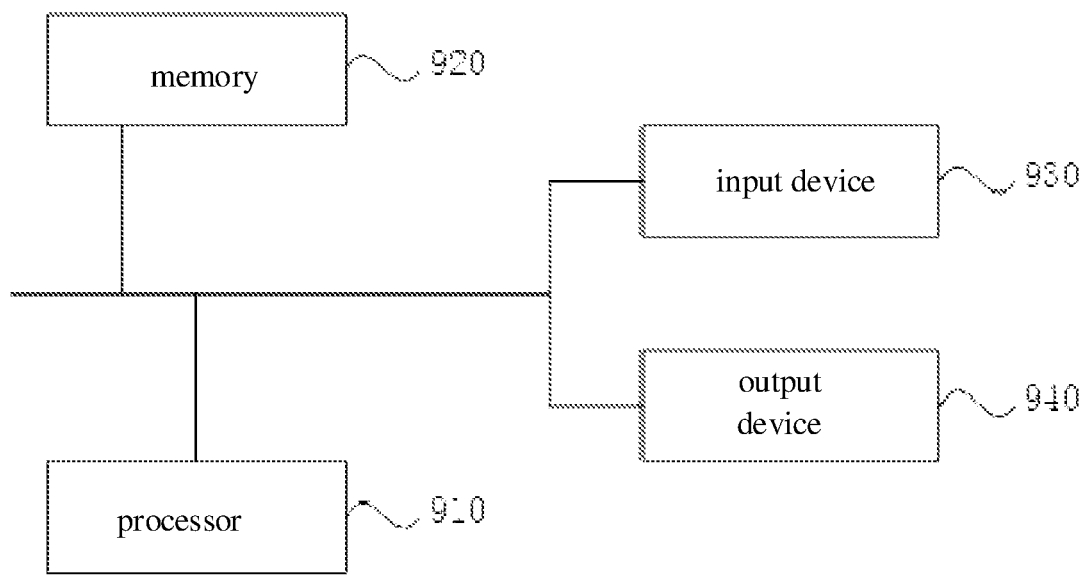
FIG. 10 is a schematic diagram of an equipment provided by the present disclosure.

FIG. 10 is a schematic diagram of an equipment provided by the present disclosure. As illustrated in FIG. 10, the equipment includes: one or more processors 910 and a memory 920. In FIG. 10, one processor 910 is taken as an example. The equipment may further include an input device 930 and an output device 940.

The processor 910, the memory 920, the input device 930, and the output device 940 in the equipment may be connected through a bus or otherwise. In FIG. 10, the connection through the bus is taken as an example.

The memory 920 is a non-transitory computer-readable storage medium, which may be used to store software programs, computer-executable programs, and modules, like program instructions/modules corresponding to the method for obstacle or ground recognition in the present disclosure (for example, the point cloud data determining module 710, the altitude determining module 720, and the obstacle determining module 730 illustrated in FIG. 8 or the point cloud data determining module 810, the altitude determining module 820, the obstacle determining module 830, and the flight control module 840 illustrated in FIG. 9). The processor 910 executes various functional applications and data processing of the computer device by running software programs, instructions, and modules stored in the memory 920, i.e., implements the method for obstacle or ground recognition as described above, that is: determining point cloud data of a region in front of an aircraft; dividing the front region into several subregions, and determining the altitude of each of the subregions based on the point cloud data in each of the subregions; and performing linear fitting on the altitudes of the several subregions, and determining whether an obstacle and/or ground is present in the front region based on the fitting result.

Alternatively, the method for flight control as described above may also be implemented, that is: determining point cloud data of a region in front of an aircraft; dividing the front region into several subregions, and determining the altitude of each of the subregions based on the point cloud data in each of the subregions; performing a linear fitting on the altitudes of the subregions, and determining whether an obstacle or ground is present in the front region according to the fitting result; and controlling the aircraft to perform an obstacle avoidance operation if the obstacle is present in the front region, and controlling the aircraft to perform a terrain simulation flying if the ground is present in the front region.

The memory 920 may include a storage program region and a storage data region, where the storage program region may store an operating system and application programs required for at least one function, and the storage data region may store data created on the basis of the use of the computer device, and the like. In addition, the memory 920 may include a high-speed random access memory, and may also include a non-transitory memory, for example at least one magnetic disk storage device, a flash memory device, or other non-transitory solid-state storage device. The memory 920 may alternatively include memories remotely set with respect to the processor 910, and these remote memories may be connected to the terminal device through a network. Instances of the above network include, but are not limited to, the Internet, an intranet, a local area network, a mobile communication network, and combinations thereof.

The input device 930 may be used to receive inputted numeric or character information, and generate key signal inputs related to user settings and function control of the computer device. The output device 940 may include a display device such as a display screen.

A computer-readable storage medium is provided by the present disclosure, on which a computer program is stored. When executed by the processor, the program causes the processor to implement the method for obstacle or ground recognition provided by the present disclosure, that is: determining point cloud data of a region in front of an aircraft; dividing the front region into several subregions, and determining the altitude of each of the subregions based on the point cloud data in each of the subregions; and performing linear fitting on the altitudes of the several subregions, and determining whether an obstacle and/or ground is present in the front region based on the fitting result.

Alternatively, when executed by the processor, the program may also implement the method for flight control provided by the present disclosure, that is: determining point cloud data of a region in front of an aircraft; dividing the front region into several subregions, and determining the altitude of each of the subregions based on the point cloud data in each of the subregions; performing a linear fitting on the altitudes of the subregions, and determining whether an obstacle or ground is present in the front region according to the fitting result; and controlling the aircraft to perform an obstacle avoidance operation if the obstacle is present in the front region, and controlling the aircraft to perform a terrain simulation flying if the ground is present in the front region.

Any combination of one or more computer-readable medium may be used. The computer-readable medium may be a computer-readable signal medium or a computer-readable storage medium. The computer-readable storage medium may be, for example, but not limited to, an electronic, magnetic, optical, electromagnetic, infrared, or semiconductor system, apparatus, or device, or any combination thereof. More specific examples (non-exhaustive list) of computer-readable storage media include: electrical connections with one or more wires, portable computer disks, hard disks, random access memory (RAM), read-only memory (ROM), Erasable programmable read-only memory (EPROM or flash memory), optical fiber, portable compact disk read-only memory (CD-ROM), optical storage device, magnetic storage device, or any suitable combination of the foregoing. In this document, a computer-readable storage medium may be any tangible medium that contains or stores a program that may be used by or in combination with an instruction execution system, apparatus, or device.

The computer-readable signal medium may include a data signal in baseband or propagated as part of a carrier wave, which carries a computer-readable program code. Such propagated data signal may be in many forms, including, but not limited to, electromagnetic signals, optical signals, or any suitable combination of the foregoing. The computer-readable signal medium may also be any computer-readable medium other than a computer-readable storage medium, and the computer-readable medium may send, propagate, or transmit a program for use by or in connection with an instruction execution system, apparatus, or device.

Program codes embodied on the computer-readable medium may be transmitted using any appropriate medium, including but not limited to wireless, wireline, optical fiber cable, RF, etc., or any suitable combination of the foregoing.

Computer program codes for performing the operations of the present disclosure may be written in one or more programming languages, or combinations thereof, which include object-oriented programming languages such as Java, Smalltalk, C++, and conventional Procedural programming language such as "C" or similar programming language. The program codes may be executed entirely on the user's computer, partly on the user's computer, as an independent software package, partly on the user's computer and partly on a remote computer, or entirely on a remote computer or server. In the case of a remote computer, the remote computer may be connected to the user's computer through any kind of network, including a local region network (LAN) or a wide region network (WAN), or it may be connected to an external computer (for example, through an Internet connection provided by the Internet service provider).

Note that, the above are only the preferred embodiments of the present disclosure and the applied technical principles. Those skilled in the art will understand that the present disclosure is not limited to the specific embodiments described herein, and various obvious changes, readjustments and substitutions can be made by those skilled in the art without departing from the scope of protection of the present disclosure. Therefore, although the present disclosure has been described in more detail through the above embodiments, the present disclosure is not only limited to the above embodiments. Without departing from the concept of the present disclosure, more equivalent embodiments may be included, and the scope of the present disclosure is determined by the scope of the appended claims.

What is claimed is:

1. A method for obstacle or ground recognition, comprising the following acts performed by a controller in an aircraft:
   receiving raw data of a region in front of the aircraft;
   determining point cloud data of the region in front of the aircraft based on the raw data;
   dividing the front region into several subregions, and determining an altitude of each of the subregions according to the point cloud data in each of the subregions;
   performing linear fitting on the altitudes of the several subregions to obtain a slope and a mean square error of a fitted line, and determining whether an obstacle and/or ground is present in the front region according to the slope and the mean square error of the fitted line; and
   controlling the aircraft based on whether an obstacle and/or ground is present in the front region.

2. The method of claim 1, wherein performing linear fitting on the altitudes of the several subregions, comprises:
performing the linear fitting with a horizontal distance between the aircraft and each of the subregions as an abscissa and with the altitude of each of the subregions as an ordinate.

3. The method of claim 2, wherein determining whether an obstacle and/or ground is present in the front region, comprises:
if the slope of the fitted line is less than a slope threshold, and the mean square error of the fitted line is less than an error threshold, determining that the ground is present in the front region;
if the slope of the fitted line is greater than or equal to the slope threshold, or if the mean square error of the fitted line is greater than or equal to the error threshold, determining that an obstacle is present in the front region.

4. The method of claim 1, wherein performing linear fitting on the altitudes of the several subregions, comprises:
performing a piecewise linear fitting with a horizontal distance between the aircraft and each of the subregions as an abscissa and with the altitude of each of the subregions as an ordinate.

5. The method of claim 4, wherein determining whether an obstacle and/or ground is present in the front region, comprises:
determining an average value of slopes of lines generated from the piecewise linear fitting;
if the difference between the slope of each of the lines generated from the piecewise linear fitting and the average value is less than a first set value, the average value is less than a slope threshold, and a mean square error of each of the lines generated from the piecewise linear fitting is less than a second set value, determining that the ground is present in the front region;
if the difference is greater than or equal to the first set value, and/or if the average value is greater than or equal to the slope threshold, and/or if the mean square error is greater than or equal to the second set value, determining that the obstacle is present in the front region.

6. The method of claim 1, wherein dividing the front region into several subregions, comprises:
equidistantly dividing the front region into the subregions arranged in order along a heading of the aircraft.

7. The method of claim 1, wherein determining the altitude of each of the subregions according to the point cloud data in each of the subregions, comprises:
storing the point cloud data into arrays of corresponding subregions;
for each of the subregions, determining an average altitude based on all point cloud data in the array of the subregion, or determining the average altitude based on remaining point cloud data in the array of the subregion after removing a set number of point cloud data from the array of the subregion based on a descending order of altitudes; and
taking the average altitude as the altitude of the subregion.

8. The method of claim 1, further comprising, before determining the altitude of each of the subregions according to the point cloud data in each of the subregions:
performing a downsampling processing on the point cloud data.

9. The method of claim 1, further comprising:
determining the region in front of the aircraft based on a preset route of the aircraft, a position of the aircraft and a width of the aircraft, wherein, a horizontal distance from each point in the front region to the aircraft is within a first set distance range, and a vertical distance from each point in the front region to the aircraft is within a second set distance range.

10. The method of claim 9, wherein determining point cloud data of the region in front of the aircraft, comprises:
determining point cloud data of a detection region of the aircraft, and filtering out point cloud data outside the front region to obtain the point cloud data of the region in front of the aircraft, wherein the detection region is an effective detection range of the aircraft.

11. The method of claim 1, wherein controlling the aircraft comprises:
controlling the aircraft to perform an obstacle avoidance operation in response to the obstacle being present in the front region, and controlling the aircraft to perform a terrain simulation flying in response to the ground being present in the front region.

12. A device for obstacle or ground recognition, comprising:
a processor;
a memory, configured to store instructions executable by the processor,
wherein the processor is configured to run a program corresponding to the instructions by reading the instructions stored in the memory, so as to perform:
receiving raw data of a region in front of an aircraft;
determining point cloud data of the region in front of the aircraft based on the raw data;
dividing the front region into several subregions, and determining an altitude of each of the subregions based on the point cloud data in each of the subregions; and
performing linear fitting on the altitudes of the several subregions to obtain a slope and a mean square error of a fitted line, and determining whether an obstacle and/or ground is present in the front region according to the slope and the mean square error of the fitted line;
controlling the aircraft based on whether an obstacle and/or ground is present in the front region, the controlling being implemented remotely from the aircraft or on the aircraft.

13. The device of claim 12, wherein the processor is configured to perform a piecewise linear fitting with a horizontal distance between the aircraft and each of the subregions as an abscissa and with the altitude of each of the subregions as an ordinate.

14. The device of claim 13, wherein the processor is configured to:
determine an average value of slopes of lines generated from the piecewise linear fitting;
if the difference between the slope of each of the lines generated from the piecewise linear fitting and the average value is less than a first set value, the average value is less than a slope threshold, and a mean square error of each of the lines generated from the piecewise linear fitting is less than a second set value, determine that the ground is present in the front region;
if the difference is greater than or equal to the first set value, and/or if the average value is greater than or equal to the slope threshold, and/or if the mean square error is greater than or equal to the second set value, determine that the obstacle is present in the front region.

15. The device of claim 12, wherein the processor is configured to equidistantly divide the front region into the subregions arranged in order along a heading of the aircraft.

16. The device of claim 12, wherein the processor is configured to:
  store the point cloud data into arrays of corresponding subregions;
  for each of the subregions, determine an average altitude based on all point cloud data in the array of the subregion, or determine the average altitude based on remaining point cloud data in the array of the subregion after removing a set number of point cloud data from the array of the subregion based on a descending order of altitudes; and
  take the average altitude as the altitude of the subregion.

17. The device of claim 12, wherein the processor is further configured to:
  determine the region in front of the aircraft based on a preset route of the aircraft, a position of the aircraft and a width of the aircraft, wherein, a horizontal distance from each point in the front region to the aircraft is within a first set distance range, and a vertical distance from each point in the front region to the aircraft is within a second set distance range.

18. The device of claim 17, wherein the processor is configured to:
  determine point cloud data of a detection region of the aircraft, and filter out point cloud data outside the front region to obtain the point cloud data of the region in front of the aircraft, wherein the detection region is an effective detection range of the aircraft.

19. An aircraft, comprising:
  a detection device, disposed in a front of the aircraft, and configured to obtain raw data in a region in front of the aircraft;
  a determination device, configured to receive the raw data, to calculate point cloud data in the front region based on the raw data, to divide the front region into several subregions, to determine an altitude of each of the subregions according to the point cloud data in each of the subregions, to perform linear fitting on the altitudes of the several subregions to obtain a slope and a mean square error of a fitted line, and to determine whether an obstacle and/or ground is present in the front region according to the slope and the mean square error of the fitted line; and
  a flight controller, which controls the aircraft based on the determination of whether an obstacle and/or ground is present in the front region.

20. The aircraft of claim 19, wherein the flight controller is further configured to:
  control the aircraft to perform an obstacle avoidance operation in response to the obstacle being present in the front region, and control the aircraft to perform a terrain simulation flying in response to the ground being present in the front region.

* * * * *